D. C. MULVIHILL.
LIFTING JACK.
APPLICATION FILED MAY 15, 1919.
1,343,275.
Patented June 15, 1920.
2 SHEETS—SHEET 1.
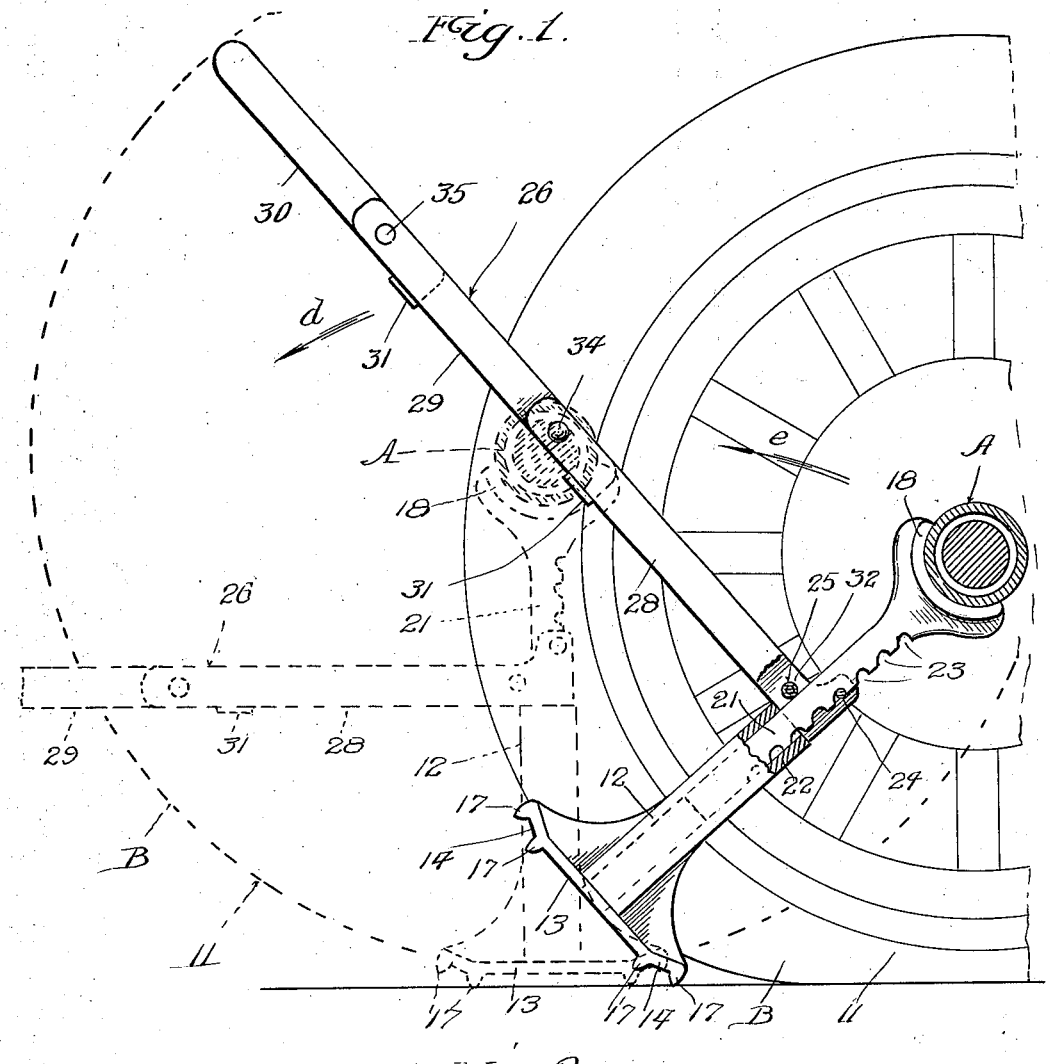
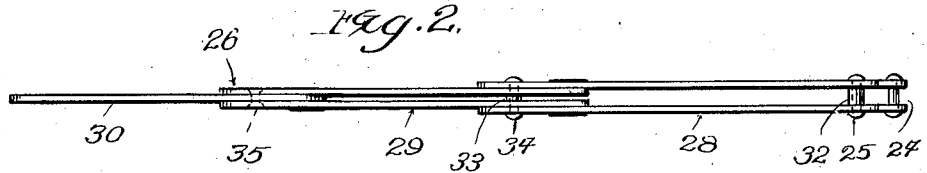
INVENTOR.
Daniel C. Mulvihill.
BY
his ATTORNEY.

D. C. MULVIHILL.
LIFTING JACK.
APPLICATION FILED MAY 15, 1919.

1,343,275.

Patented June 15, 1920.
2 SHEETS—SHEET 2.

INVENTOR.
Daniel C. Mulvihill,
BY
Charles O. Shewey,
his ATTORNEY.

UNITED STATES PATENT OFFICE.

DANIEL C. MULVIHILL, OF HANNIBAL, MISSOURI.

LIFTING-JACK.

1,343,275.　　　　　Specification of Letters Patent.　　Patented June 15, 1920.

Application filed May 15, 1919. Serial No. 297,194.

*To all whom it may concern:*

Be it known that I, DANIEL C. MULVIHILL, a citizen of the United States, and a resident of Hannibal, Marion county, and State of Missouri, have invented certain new and useful Improvements in Lifting-Jacks, of which the following is declared to be a full, clear, and exact description.

This invention relates to lifting jacks, and more particularly to that type of lifting jacks adapted for lifting the wheels of motor vehicles from the ground to permit removal and replacement of the tires, or wheels. The principal object of this invention is to provide a simple and substantial lifting jack which may be readily applied to either axle of the vehicle, and which may be manipulated with little effort to raise the adjacent wheel. Another object is to provide a jack of the lever type with a disconnectible and foldable lever whereby the parts may occupy a minimum amount of space when stored away.

With these, and other objects and advantages in view, this invention consists in the several novel features hereinafter fully set forth and claimed.

This invention is clearly illustrated in the accompanying drawings, in which:

Figure 1 is a side elevation, partly broken out, of a lifting jack embodying a simple form of the present invention, applied to an axle of a vehicle, in position to lift the same, and showing the parts in lifted position, in dotted lines;

Fig. 2 is a plan of the handle of the jack;

Figure 3:
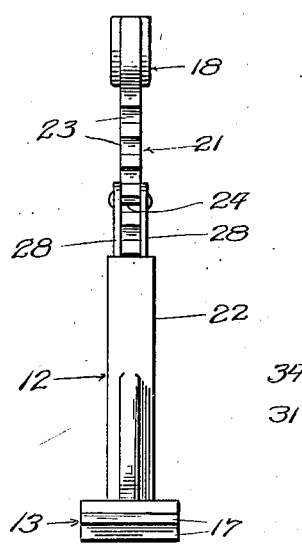
Fig. 3 is an end elevation of the jack.

Referring to said drawings, the reference character A, designates the axle of a motor vehicle, and 11 one of the wheels which is provided with a tire B as usual. In Fig. 1 the tire is shown, in full lines, in a flat or deflated condition; and, in dotted lines, in normal condition with the wheel raised from the ground.

The jack comprises, in general, a post 12, a post extension 21 and a disconnectible and foldable handle 26. The post 12 has a wide base 13, formed at its ends, with inclined end portions 14, and teeth or spurs 17, are formed on the under side of the base for affording a grip or purchase on the surface supporting the vehicle and lifting jack.

The post 12 is formed with a housing 22 in which is adjustably secured the post extension 21. The post extension may be in the form of a bar slidably mounted in the housing 22, and having on its upper end a yoke, or U shaped bearing member 18, which is adapted to engage with either axle of a vehicle.

The handle 26 is capable of being connected to and disconnected from the post extension 21, and its attached end, when in use, rests upon the upper end of the post and supports the post extension. For the purpose of adjustment the post extension is shown as formed with notches 23 in one edge, any of which may receive a pin or strut 24 on the lever. In use, the post extension is supported by the pin or strut 24, and the lever is supported by the post, as is clearly shown. A second pin or strut 25 spaced beyond the pin 24 engages in the edge of the post opposite the edge containing the notches, and with said first mentioned pin grips the post extension between them. The pin 24 is placed somewhat above the pin 25 in order that a greater purchase may be had on the post.

Figure 4:
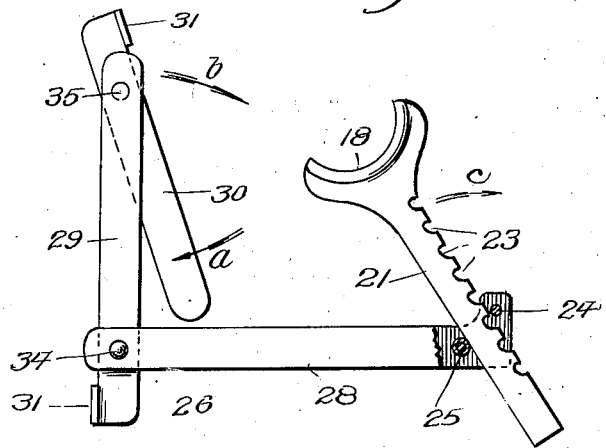
Fig. 4 is a side elevation, partly broken out, of the handle and a certain post extension, the handle being shown as partly unfolded, and the post extension being shown in a position occupied when it is being attached to or removed from the handle.
Figure 5:
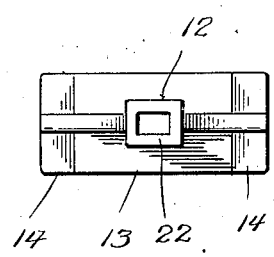
Fig. 5 is a plan of the post.
Figure 6:
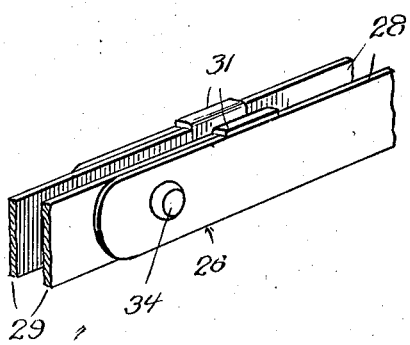
Fig. 6 is a perspective view of a fragment of the handle, showing the same in an inverted position.

The handle 26 is made of a number of lengths of bars, 28, 29, 30, hinged together by pins or rivets as at 34, 35, and certain ones provided with shoulders or flanges 31 which engage the under sides of the adjacent bars, to make the handle rigid when in use. In the form shown, two parallel bars 28 are used, which straddle the post extension 21, and between the bars 28 are secured two parallel spaced bars 29, between which is the single end bar 30. The bars 28 and 29 are spaced apart by thimbles or washers 32, 33, surrounding the pins or rivets 25, 34. In Fig. 4 the handle is shown as partly folded up; to completely fold it, the bar 30 is swung in the direction of the arrow *a* (Fig. 4) until it is confined between the bars 29, after which the folded bars 29, 30 are swung in the direction of the arrow *b*, until they are confined between the bars 28. The entire handle is thus contained practically in the space occupied by the two spaced bars 28.

In use, the handle is unfolded, and the post extension 21 withdrawn from the housing of the post, and inserted between the pins 24, 25, as seen in Fig. 4, and swung in the direction of the arrow c, to bring the pin 24 into the desired notch. The post extension is then inserted into the housing and the adjacent end of the handle brought down on the top of the post. To lift a wheel free from the ground or other surface upon which it rests, the upper end of the post extension is placed against the underside of the vehicle axle and the lower, adjacent edge of the base is placed on the ground as shown in full lines in Fig. 1. The handle 26 of the jack is then forced downward, thereby swinging it and the post in the direction indicated by the arrows d, e, and bringing the post into an upright position, as seen in dotted lines in the same figure, in which position it supports the axle and wheel in raised position. The wheel with its tire, or the tire may be removed and replaced by another wheel or tire.

This lifting jack is intended principally for use on the lighter types of motor vehicles as it would require such a long handle, when used for heavy vehicles, as to be inconveniently long.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. A lifting jack for vehicles, comprising a post having a wide base and a yoke shaped upper end portion adapted to engage the vehicle axle, and a handle adjustably secured to said end portion and forming a supporting connection between said end portion and base and extending at right angles to the post.

2. A lifting jack for vehicles, comprising a lengthwise adjustable post having a wide base, and a yoke shaped upper end adapted to engage the vehicle axle, and a handle adjustably and removably secured to the post by the lengthwise adjustable part thereof, and extending at right angles to the post.

3. A lifting jack for vehicles, comprising a post having a wide base and a lengthwise extending housing, a post extension in said housing having a yoke shaped end adapted to engage the vehicle axle, and a handle secured to said post extension and forming the supporting connection between said extension and post.

4. A lifting jack for vehicles, comprising a post having a wide base and a lengthwise extending housing, a post extension adjustably mounted in said housing and having a yoke shaped end adapted to engage the vehicle axle, and a handle removably secured to said post extension and forming the supporting connection between said extension and post.

5. A lifting jack for vehicles, comprising a post having a wide base and a lengthwise extending housing, a post extension in said housing, having a yoke shaped end adapted to engage the vehicle axle, said post extension being formed with notches in one edge, and a handle having spaced pins at one end, one of which is adapted to enter any of said notches in said post extension, and the other to bear against the reverse side of the post, said handle being arranged to rest on the post to support the post extension.

6. A lifting jack for vehicles, comprising a post having a wide base and a yoke shaped end adjustably mounted in said base and adapted to engage the vehicle axle, and a foldable handle comprising a plurality of lengths of bars hinged together, certain of which are arranged in pairs, those of one pair being hinged to those of another pair, and having shoulders formed thereon adapted to bear against adjacent bars for giving rigidity to the handle, said handle being detachably connected to the yoke shaped end of said post and forming a supporting connection between said yoke shaped end and base.

D. C. MULVIHILL.